United States Patent
Roberts et al.

(10) Patent No.: US 9,082,191 B2
(45) Date of Patent: Jul. 14, 2015

(54) LEVEL SET SEGMENTATION OF VOLUME DATA

(75) Inventors: Mike Roberts, Calgary (CA); Mario Costa Sousa, Calgary (CA); Joseph Ross Mitchell, Calgary (CA)

(73) Assignee: Calgary Scientific Inc., Alberta (CA)

( * ) Notice: Subject to any disclaimer, the term of this patent is extended or adjusted under 35 U.S.C. 154(b) by 587 days.

(21) Appl. No.: 12/924,325

(22) Filed: Sep. 24, 2010

(65) Prior Publication Data

US 2011/0074780 A1    Mar. 31, 2011

Related U.S. Application Data

(60) Provisional application No. 61/272,443, filed on Sep. 25, 2009.

(51) Int. Cl.
| | |
|---|---|
| G06T 7/00 | (2006.01) |
| G06T 15/00 | (2011.01) |
| G06T 17/00 | (2006.01) |
| G06K 9/00 | (2006.01) |
| G06K 9/34 | (2006.01) |
| G06T 15/08 | (2011.01) |

(52) U.S. Cl.
CPC ............. *G06T 7/0083* (2013.01); *G06T 7/0089* (2013.01); *G06T 15/08* (2013.01); *G06T 2207/10072* (2013.01); *G06T 2207/20161* (2013.01); *G06T 2207/30016* (2013.01)

(58) Field of Classification Search
USPC .......................................... 345/424; 382/128
See application file for complete search history.

(56) References Cited

U.S. PATENT DOCUMENTS

| | | | |
|---|---|---|---|
| 5,025,400 A | 6/1991 | Cook et al. | |
| 5,187,574 A | 2/1993 | Kosemura et al. | |
| 6,028,608 A | 2/2000 | Jenkins | |
| 6,119,154 A | 9/2000 | Weaver et al. | |

(Continued)

FOREIGN PATENT DOCUMENTS

| | | |
|---|---|---|
| CA | 2261069 | 11/1998 |
| CA | 2239994 | 12/1998 |

(Continued)

OTHER PUBLICATIONS

T. Bülow, C. Lorenz and S. Renisch, "A General Framework for Tree Segmentation and Reconstruction from Medical Volume Data", In: Proceedings of the 7th International Conference on Medical Image Computing and Computer-Assisted Intervention, MICCAI 2004, held in Saint-Malo, France, Sep. 26-29, 2004, vol. 3216, pp. 533-540.*

(Continued)

*Primary Examiner* — Ulka Chauhan
*Assistant Examiner* — Roberta D Prendergast
(74) *Attorney, Agent, or Firm* — Meunier Carlin & Curfman LLC (57) ABSTRACT

A method for segmenting a volume dataset is provided. During initialization a level set field within a volume dataset is initialized and an initial set of active voxels is determined in dependence upon the initialized level set field. In an iteration process the level set field for the set of active voxels is updated followed by updating of the set of active voxels. The iteration is continued until the number of active voxels is less than a predetermined threshold. Level set segmentation data are then determined in dependence upon the level set field and provided for, for example, graphical display or storage.

16 Claims, 5 Drawing Sheets

(56) References Cited

U.S. PATENT DOCUMENTS

| | | | |
|---|---|---|---|
| 6,271,847 | B1 | 8/2001 | Shum et al. |
| 6,674,430 | B1 | 1/2004 | Kaufman et al. |
| 6,888,551 | B2 | 5/2005 | Willis et al. |
| 7,333,236 | B2 | 2/2008 | Herrmann |
| 7,370,120 | B2 | 5/2008 | Kirsch et al. |
| 7,430,261 | B2 | 9/2008 | Forest et al. |
| 7,432,935 | B2 | 10/2008 | Keller |
| 7,519,209 | B2 * | 4/2009 | Dawant et al. ............ 382/128 |
| 7,526,131 | B2 * | 4/2009 | Weber ....................... 382/199 |
| 7,574,247 | B2 * | 8/2009 | Moreau-Gobard et al. .. 600/407 |
| 7,586,953 | B2 | 9/2009 | Forest et al. |
| 7,606,314 | B2 | 10/2009 | Coleman et al. |
| 7,647,331 | B2 | 1/2010 | Li et al. |
| 7,912,259 | B2 | 3/2011 | Arditi et al. |
| 8,005,369 | B2 | 8/2011 | Ko et al. |
| 8,265,449 | B2 | 9/2012 | Nagahara et al. |
| 8,503,754 | B2 | 8/2013 | Roberts et al. |
| 8,589,995 | B2 | 11/2013 | Choi et al. |
| 2002/0101429 | A1 | 8/2002 | Abdo |
| 2003/0025599 | A1 | 2/2003 | Monroe |
| 2003/0081840 | A1 | 5/2003 | Palmer et al. |
| 2004/0005005 | A1 | 1/2004 | McIntyre et al. |
| 2005/0033758 | A1 | 2/2005 | Baxter |
| 2005/0100220 | A1 | 5/2005 | Keaton et al. |
| 2005/0105786 | A1 * | 5/2005 | Moreau-Gobard et al. .. 382/128 |
| 2005/0110791 | A1 * | 5/2005 | Krishnamoorthy et al. .. 345/419 |
| 2005/0111718 | A1 | 5/2005 | MacMahon et al. |
| 2006/0008254 | A1 | 1/2006 | Seo |
| 2006/0013482 | A1 * | 1/2006 | Dawant et al. ............ 382/173 |
| 2006/0173272 | A1 * | 8/2006 | Qing et al. ................ 600/407 |
| 2006/0222081 | A1 | 10/2006 | Carrigan |
| 2007/0031019 | A1 * | 2/2007 | Lesage et al. ............ 382/131 |
| 2007/0036402 | A1 | 2/2007 | Cahill et al. |
| 2007/0103567 | A1 | 5/2007 | Wloka |
| 2008/0008401 | A1 | 1/2008 | Zhu |
| 2008/0137921 | A1 * | 6/2008 | Simon et al. ............. 382/128 |
| 2008/0143718 | A1 * | 6/2008 | Ray et al. ................. 345/424 |
| 2008/0175377 | A1 | 7/2008 | Merrill |
| 2008/0246770 | A1 | 10/2008 | Kiefer et al. |
| 2009/0087161 | A1 | 4/2009 | Roberts et al. |
| 2011/0085025 | A1 | 4/2011 | Pace et al. |
| 2011/0126127 | A1 | 5/2011 | Mariotti et al. |
| 2015/0046953 | A1 | 2/2015 | Davidson et al. |

FOREIGN PATENT DOCUMENTS

| | | |
|---|---|---|
| CA | 2427590 | 5/2001 |
| EP | 1744287 | 4/2008 |
| WO | 2010/085898 | 8/2010 |
| WO | 2010/085899 | 8/2010 |
| WO | 2013/001344 | 1/2013 |

OTHER PUBLICATIONS

Kindlmann, G.; Whitaker, R.; Tasdizen, T.; Moller, T., "Curvature-based transfer functions for direct volume rendering: methods and applications," Proceedings of the 14th IEEE Visualization 2003 (VIS'03), pp. 513-520, Oct. 19-24, 2003.*

M. Rumpf and R. Strzodka, Level set segmentation in graphics hardware, Proceedings of IEEE International Conference on Image Processing (ICIP'01), vol. 3, pp. 1103-1106, Oct. 7-10, 2001.*

Anthony Sherbondy, Mike Houston, Sandy Napel, "Fast Volume Segmentation With Simultaneous Visualization Using Programmable Graphics Hardware", Proceedings of the 14th IEEE Visualization 2003 (VIS'03), p. 171-176, Oct. 19-24, 2003.*

Lefohn, A.E.; Kniss, J.M.; Hansen, C.D.; Whitaker, R.T., "Interactive deformation and visualization of level set surfaces using graphics hardware," IEEE Visualization 2003, VIS 2003, pp. 75-82, 24-24 Oct. 2003.*

Cates, J. E., Lefohn, A. E., & Whitaker, R. T., Sep. 2004, "GIST: an interactive, GPU-based level set segmentation tool for 3D medical images", Medical Image Analysis, vol. 8, Issue 3, pp. 217-231.*

Lefohn, Aaron, Joshua Cates, and Ross Whitaker, "Interactive, GPU-Based Level Sets for 3D Brain Tumor Segmentation", (2003).*

C. Baillard, C. Barillot, and P. Bouthemy, "Robust Adaptive Segmentation of 3D Medical Images with Level Sets," INRIA, Rennes, France, Research Report No. 1369, Nov. 2000.*

Carrillo, J., Hoyos, M., Dávila, E., Orkisz, M., 2007, "Recursive tracking of vascular tree axes in 3D medical images", International Journal of Computer Assisted Radiology and Surgery, Apr. 2007, vol. 1, Issue 6, pp. 331-339.*

Deschamps, T., "Curve and Shape Extraction with Minimal Paths and Level-Sets Techniques. Applications to 3D Medical Imaging," Ph.D. thesis, UniversitéParis—IX, Dauphine, 2001.*

Taheri, Sima. "Level-set segmentation of brain tumors in magnetic resonance images." (2008), Ph.D thesis, National University of Singapore.*

Taheri, Sima. "3D Tumor Segmentation using Level Set", Course Notes, National University of Singapore, Apr. 2006.*

Mike Roberts, Jeff Packer, Mario Costa Sousa, and Joseph Ross Mitchell. 2010. A work-efficient GPU algorithm for level set segmentation. In Proceedings of the Conference on High Performance Graphics (HPG '10). Eurographics Association, Aire-la-Ville, Switzerland, Switzerland, 123-132.*

Billeter, M., Olsson, O., Assarsson, U., "*Efficient Stream Compaction on Wide SIMD Many-Core Architectures*," in HPG'09: Proceedings of the AACM SIGGRAPH/EUROGRAPHICS Conference on High Performance Graphics (2009), pp. 159-166.

Sengupta, S., Harris, M., Zhang, Y., Owens, J.D., "*Scan Primitives for GPU Computing*," in GH'07: Proceedings of the 22$^{nd}$ ACM SIGGRAPH/EUROGRAPHICS Symposium on Graphics Hardware (2007), pp. 97-106.

Lefohn, A.E., Kniss, J.M., Hansen, C.D., Whitaker, R.T., "*A Streaming Narrow-Band Algorithm: Interactive Computation and Visualization of Level Sets*," IEEE Transactions on Visualization and Computer Graphics 10(4), pp. 422-433, 2004.

Lefohn, A.E., Cates, J.E., Whitaker, R.T., "*Interactive, GPU-Based Level Sets for 3D Segmentation*," MICCAI, pp. 564-572, 2003.

Lefohn, A.E., Kniss, J.A., Hansen, C.D., Whitaker, R.T., "*Interactive Deformation and Visualization of Level Set Surfaces Using Graphics Hardware*," IEEE Visualization 2003, pp. 75-82, 2003.

Peng, D., Merriman, B., Osher, S., Zhao, H., Kang, M., "*A PDE-Based Fast Local Level Set Method*," Journal of Computational Physics 155(2), pp. 410-438, 1999.

Whitaker, R.T., "*A Level-Set Approach to 3D Reconstruction from Range Data*," International Journal of Computer Vision 29(3), pp. 203-231, 1998.

Cocosco, C.A., Kollokian, V., Kwan, R.K.-S., Evans, A.C., "*Brain Web: Online Interface to a 3D MRI Simulated Brain Database*," NeuroImage 5(4), p. 425, 1997.

Adalsteinsson, D., Sethian, J.A., "*A Fast Level Set Method for Propagating Interfaces*," Journal of Computational Physics 8(2), pp. 269-277, 1995.

Boulos, S., et al., "Interactive Distribution Ray Tracing," Technical report UUSCI-2006-022, SCI Institute, University of Utah, 2006, 13 pages.

Christensen, P.H., et al., "Ray Differentials and Multiresolution Geometry Caching for Distribution Ray Tracing in Complex Scenes," Computer Graphics Forum (Eurographics 2003 Conference Proceedings), 2003, pp. 543-552.

Månsson, E., et al., "Deep Coherent Ray Tracing," Proceedings of the 2007 IEEE Symposium on Interactive Ray Tracing, RT, IEEE Computer Society, 2007, pp. 79-85.

Schmittler, J., et al., "SaarCOR—A Hardware Architecture for Ray Tracing," Graphics Hardware, 2002, 11 pages.

Zhou, T., et al., "Accurate depth of field simulation in real time," Computer Graphics Forum, vol. 26, 2007, pp. 15-23.

Extended European Search Report, dated Mar. 4, 2013, received in connection with European Application No. 10735473.0.

International Search Report and Written Opinion, dated Nov. 9, 2012, received in connection with International Application No. PCT/IB2012/001273.-

(56) References Cited

OTHER PUBLICATIONS

International Search Report, dated Apr. 26, 2010, received in connection with International Application No. PCT/CA2010/000152.
International Preliminary Report on Patentability and Written Opinion, dated Aug. 2, 2011, received in connection with International Application No. PCT/CA2010/000152.
International Search Report, dated May 19, 2010, received in connection with International Application No. PCT/CA2010/000153.
International Preliminary Report on Patentability and Written Opinion, dated Aug. 2, received in connection with International Application No. PCT/CA2010/000153.

* cited by examiner

LEVEL SET SEGMENTATION OF VOLUME DATA

This application claims the benefit of U.S. Provisional Patent Application No. 61/272,443 filed Sep. 25, 2009, the entire contents of which are incorporated herein by reference.

FIELD OF THE INVENTION

The instant invention relates to segmentation of volume datasets and in particular to a level set volume segmentation process for segmenting volume datasets.

BACKGROUND

Modern hospitals utilize medical images from a variety of imaging devices such as, for example, a Computer Tomography (CT) scanner or a Magnetic Resonance Imaging (MRI) scanner producing volume datasets. Segmentation of volume datasets is an important task in medical diagnostics. Manual segmentation of large volume datasets is a slow process requiring expert knowledge in pathology and anatomy.

The results of computer-assisted techniques—for example, seeded region growing—are often highly variable when the Region Of Interest (ROI) is heterogeneous, making it difficult to segment lesions—for example, brain tumors—which have variable intensity, texture, shape, and size.

Computer-assisted level set segmentation techniques reduce the variability of difficult segmentation tasks. The level set segmentation is highly flexible since it depends on intrinsic factors—such as curvature of the segmented regions—and extrinsic factors—such as intensity or texture of the image. However, the flexibility of the level set segmentation results in high computational costs—long computation time and large memory requirements. Furthermore, the level set segmentation currently lacks a quantitative criterion indicative of convergence of the segmentation.

Two distinct processes for more efficiently determining the level set field update have been disclosed recently. The first is the narrow band process—disclosed in Adalsteinson D, Sethian J A "*A Fast Level Set Method for Propagating Interfaces*", Journal of Computational Physics 8(2), pp. 269-277, 1995-where field updates are only determined on a narrow band of elements around an implicitly defined level set surface. Several processes for segmenting volume datasets have been implemented using the narrow band process. These processes use Graphics Processing Unit (GPU) virtual memory paging techniques for mapping the irregular and dynamic narrow band onto a physically contiguous domain suited for parallel computation on the GPU. A disadvantage of the narrow band process is that the entire computational domain—volume dataset—is frequently traversed in order to update the narrow band as the surface is deformed. The performance of GPU based narrow band processes is limited due to per-frame communication latency between the GPU and the Central Processing Unit (CPU), since the CPU is used for updating the narrow band.

The second process is the sparse field process-disclosed in Whitaker, R "*A Level Set Approach to 3D Reconstruction from Range Data*", International Journal of Computer Vision 29(3), pp. 203-231, 1998, and in Peng, D, Merriman, B, Osher, S, Zhao, H, and Kang, M "*A PDE Based Fast Local Level Set Method*", Journal of Computational Physics 155(2), pp. 410-438, 1999. In contrast to the narrow band process the sparse field process incrementally updates a linked list of active elements at each time step. The sparse field process avoids traversing the entire computational domain except during initialization. Unfortunately, existing sparse field processes are poorly suited for implementing using a GPU due to the use of linked lists.

It would be desirable to overcome the drawbacks associated with the implementation of the level set technique for segmenting volume datasets.

SUMMARY OF EMBODIMENTS OF THE INVENTION

In accordance with embodiments of the present invention there is provided a level set segmentation method. Using a processor a level set field within a multi-dimensional dataset comprising a plurality of voxels is initialized. The multi-dimensional dataset is indicative of an object. Using the processor an initial set of active voxels is determined in dependence upon the initialized level set field. Using the processor the level set field is repeatedly updated for the set of active voxels followed by updating the set of active voxels until a quantitative stopping criterion is met. Using the processor level set segmentation data are then determined in dependence upon the level set field. The level set segmentation data are indicative of a feature of the object. Using the processor the level set segmentation data are then provided, for example, for visualization or storage.

In accordance with embodiments of the present invention there is provided a storage medium having stored therein executable commands for execution on a processor. The processor when executing the commands performs initialization of a level set field within a multi-dimensional dataset comprising a plurality of voxels. The multi-dimensional dataset is indicative of an object.

The processor determines an initial set of active voxels in dependence upon the initialized level set field. The processor then repeatedly updates the level set field for the set of active voxels followed by updating the set of active voxels until a quantitative stopping criterion is met. The processor then determines level set segmentation data in dependence upon the level set field. The level set segmentation data are indicative of a feature of the object. The processor then provides the level set segmentation data, for example, for visualization or storage.

BRIEF DESCRIPTION OF THE FIGURES

Exemplary embodiments of the invention will now be described in conjunction with the following drawings, in which:

FIGS. 4*a* to 4*e* are diagrams illustrating a 3D segmentation process using the level set segmentation method according to embodiments of the invention;

FIGS. 5*a* to 5*e* are diagrams illustrating 2D slices of a segmentation process using the level set segmentation method according to embodiments of the invention;

FIGS. 6*a* to 6*e* are diagrams illustrating 2D slices of a final segmentation result using the level set segmentation method according to embodiments of the invention; and, FIGS. 7a and 7b are diagrams illustrating a comparison of the performance of the level set segmentation method according to embodiments of the invention with a state of the art method.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Unless defined otherwise, all technical and scientific terms used herein have the same meaning as commonly understood by one of ordinary skill in the art to which the invention belongs.

While the description of the embodiments herein below is with reference to segmentation of volume datasets generated in medical imaging, it will become evident to those skilled in the art that the embodiments of the invention are not limited thereto, but are also applicable for segmentation of volume datasets generated in various different applications such as, for example, visualization of 3D measurement data as well as numerical simulation data in engineering and science. Furthermore, the embodiments of the invention are not limited to volume datasets, but are also applicable for segmentation of other multi-dimensional datasets such as, for example, 2D and 4D datasets.

In the level set method for image segmentation an implicitly represented seed surface is embedded within a volume dataset—with the volume dataset being indicative of an object such as, for example, a patient's organs—and then iteratively deformed to envelop nearby anatomical ROIs. Each surface point is deformed along a path normal to the local surface. An application-specific speed function $F(x,t)$ is used to determine the local rate of surface motion, where x indicates a voxel in the image and t indicates a time instant of the segmentation process. In the segmentation method according to embodiments of the invention a speed function determining the surface speed using the mean surface curvature and the underlying intensity of the image has been employed, but as is evident to those skilled in the art is not limited thereto and various other types of speed functions are employable. Speed functions of this type are disclosed, for example, in:

Lefohn A E, Cates J E, Whitaker R E "*Interactive, GPU-Based Level Sets for 3D Segmentation*", MICCAI, pp. 564-572, 2003; and, Lefohn A E, Kniss J A, Hansen, Whitaker R E "*Interactive Deformation and Visualization of Level Set Surfaces Using Graphics Hardware*", IEEE Visualization 2003, pp. 75-82, 2003.

By taking into account the level set surface's curvature, the surface is prevented from leaking into inappropriate regions across weak, incidental connections at ROI boundaries. For the implicit field $\phi(x,t): \Re^4 \rightarrow \Re$, the level set surface is defined as $S(t) = \{x | \phi(x,t) = 0\}$. The level set field update equation is then expressed as:

$$\phi(x, t+\Delta t) = \phi(x,t) + \Delta t F(x,t) |\nabla \phi(x,t)| \qquad (1)$$

In the level set segmentation method according to embodiments of the invention calculations are substantially limited to a minimal set of active voxels of the volume dataset. The minimal set of active voxels is defined as $A(t) = \{x | \phi(x,t) \neq \phi(x, t+\Delta t)\}$. From equation (1) two conditions are derived, each of which is sufficient to imply that a voxel x is inactive and, therefore, excluded from the minimal set of active voxels: $x \notin A(t)$. Both conditions are independent of the chosen speed function. The first condition $\zeta_1(x,t)$ is:

$$\zeta_1(x,t) \equiv |\nabla \phi(x,t)| = 0, \qquad (2)$$

which has been disclosed, for example, in:

Lefohn A E, Cates J E, Whitaker R E "*Interactive, GPU-Based Level Sets for 3D Segmentation*", MICCAI, pp. 564-572, 2003; and, Lefohn A E, Kniss J A, Hansen, Whitaker R E "*Interactive Deformation and Visualization of Level Set Surfaces Using Graphics Hardware*", IEEE Visualization 2003, pp. 75-82, 2003.

For deriving the second condition—according to the embodiments of the invention—it is assumed that $N(x)$ is the set of voxels in the immediate neighborhood of a voxel x and includes x itself. For example, the immediate neighborhood is defined to comprise all voxels bordering on the voxel x. It is observed that if $\delta\phi(x,t)/\delta t = 0$, then the level set surface $\phi$ is in a state of equilibrium at x. Assuming the speed function is defined locally, the only event capable of disrupting the state of equilibrium at the voxel x is if level set surface $\phi(n)$ changes for a neighbor voxel $n \in N(x)$. Therefore, if all of the voxels in $N(x)$ are in a state of temporal equilibrium at time $t-\Delta t$, then the voxel x will be in a state of equilibrium at time t. This leads to the second condition $\zeta_2(x,t)$ as follows:

$$\zeta_2(x, t) \equiv \forall_{n \in N(x)} : \frac{\delta\phi(n, t - \Delta t)}{\delta t} = 0. \qquad (3)$$

The minimal set of active voxels is then formally expressed as follows:

$$A(t) = \begin{cases} \{x | \neg \zeta_1(x, 0)\}, & t = 0 \\ \{x | \neg \zeta_1(x, t) \land \neg \zeta_2(x, t)\}, & t > 0 \end{cases} \qquad (4)$$

Figure 1:
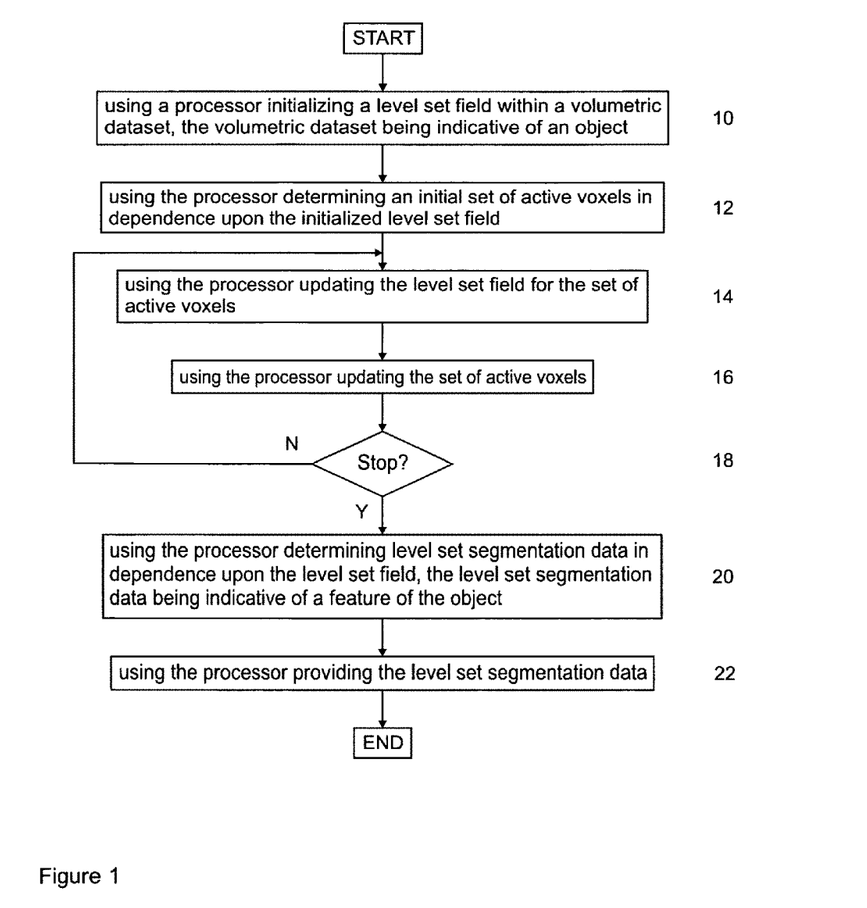
FIG. 1 is a simplified flow diagram of a level set segmentation method according to embodiments of the invention.

Referring to FIG. 1, a method for segmenting a volume dataset according to an embodiment of the invention is provided. At 10, using a processor a level set field is initialized within the volume dataset. For example, a user specifies a sphere within an image volume of a medical image. Every voxel in the initial level set field $\phi$ is then initialized to the signed and clamped distance of the user specified sphere as disclosed, for example, in:

Lefohn A E, Cates J E, Whitaker R E "*Interactive, GPU-Based Level Sets for 3D Segmentation*", MICCAI, pp. 564-572, 2003; and, Lefohn A E, Kniss J A, Hansen, Whitaker R E "*Interactive Deformation and Visualization of Level Set Surfaces Using Graphics Hardware*", IEEE Visualization 2003, pp. 75-82, 2003.

After having initialized the level set field an initial minimal set of active voxels for t=0 is determined—12—in dependence upon the initialized level set field according to equation (4). The determination of the initial minimal set of active voxels enables performing the remainder of the segmentation process absent calculations over substantially the entire volume dataset.

At 14, the level set field update is performed on the active voxels—of the minimal set of active voxels—according to equation (1). After updating the level set field, the minimal set of active voxels itself is updated—16. The updating comprises removing voxels that are no longer active and adding voxels that have become active. Since either $\zeta_1$ or $\zeta_2$ is sufficient to exclude a voxel from the active set, both $\zeta_1$ and $\zeta_2$ must be false for a corresponding voxel to be included in the minimal set of active voxels, as expressed in equation (4) for t>0. Therefore, the process for determining the minimal set of active voxels according to the embodiment of the invention is:

| 1 | $A(t + \Delta t) \leftarrow \phi$ |
|---|---|
| 2 | for each voxel $x \in A(t)$ |
| 3 |   for each voxel $n \in N(x)$ |
| 4 |     if $\frac{\delta\phi(n, t)}{\delta t} \neq 0$ |
| 5 |       for each voxel $y \in N(n) \cap N(x)$ |
| 6 |         if $\phi(y, t) \neq \phi(x, t)$ |
| 7 |           $A(t + \Delta t) \leftarrow A(t + \Delta t) \cup \{x, y\}$ |

The conditions $\zeta_1$ and $\zeta_2$ are determined by steps 6 and 4, respectively. At the end of the execution of the outermost loop, the minimal set of active voxels is determined for the next time step.

The steps 14 and 16 in the flow diagram illustrated in FIG. 1 are then repeated until a quantitative stopping criterion is satisfied—18. State of the art segmentation processes lack a quantitative criterion for determining convergence of the same resulting in limited clinical utility. The determination of the minimal set of active voxels in step 16 provides a quantitative criterion for determining convergence. As the segmentation process converges the number of active voxels approaches 0. Therefore, the level set field has converged once the number of active voxels has dropped to 0. In the method for segmenting a volume dataset according to an embodiment of the invention the level set field is deemed to have converged when the number of active voxels has dropped below a predetermined threshold. The threshold is determined, for example, in dependence upon the volume dataset and the speed function.

After convergence, level set segmentation data are determined in dependence upon the level set field—20. Upon completion of the segmentation, the level set field indicates the feature containing the region in which the seed surface was placed. The segmentation data are then—22—provided by the processor, for example, for visualization or storage.

Figure 2:
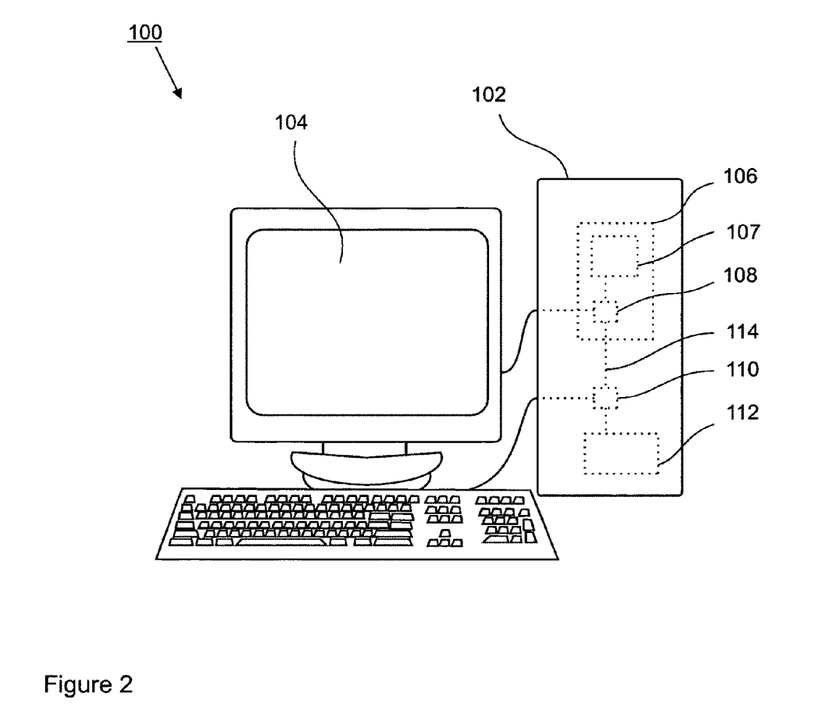
FIG. 2 is a simplified block diagram of a system for implementing the level set segmentation method according to embodiments of the invention; and, FIG. 3 is a simplified block diagram illustrating a GPU implementation of the level set segmentation method according to embodiments of the invention.

Referring to FIG. 2, an example 100 of a system for implementing the method for segmenting a volume dataset according to an embodiment of the invention is shown. The system comprises, for example, a workstation 102 for processing volume datasets using a GPU 106. For example, a medical practitioner is processing a volume dataset for performing a diagnosis. During the processing the medical practitioner interacts with the GPU for segmenting the volume dataset, for example, determining a seed surface, which is displayed on monitor 104. It will become evident to those skilled in the art that the embodiments of the invention are implementable by executing executable commands stored in memory 107 and executed on processor 108 of one of various standard GPUs wherein the executable commands are created using one of various standard programming languages and GPUs. Alternatively, the embodiments of the invention are implemented using other processing units such as, for example, a CPU 110 and system memory 112 of various types of computers.

In an example, the method for segmenting a volume dataset according to an embodiment of the invention has been implemented using the CUDA programming language for execution on an Intel 2.5 GHz Xeon Processor with 4 GB of memory and an NVIDIA GTX 280 GPU with 1.5 GB of memory. The CUDA programming language enables a programmer to write computational kernels in a language similar to C. The computational kernels are launched by a host application and are executed in parallel on the GPU. Since the GPU is capable of executing a plurality of instances of a computational kernel simultaneously and each kernel has random read and write access to the GPU memory, the CUDA programming language is well suited for implementing data-parallel processes.

Figure 3:
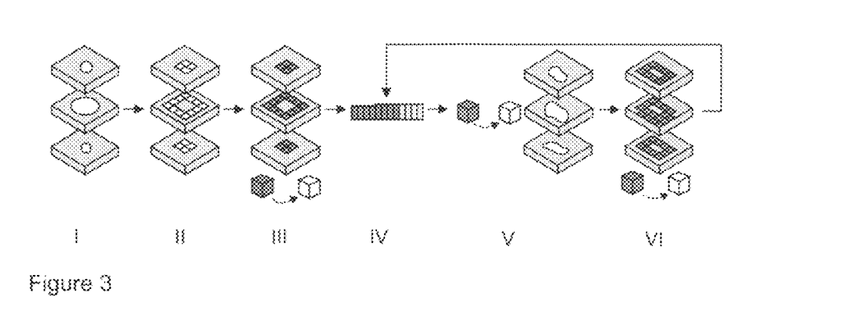
Figure 4A:
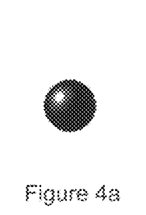
Figure 4B:
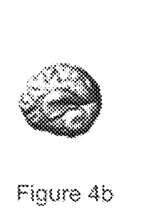
Figure 4C:
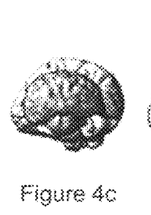
Figure 4D:
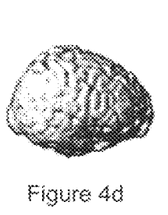
Figure 4E:
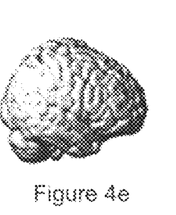
Figure 5A:
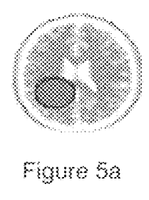
Figure 5B:
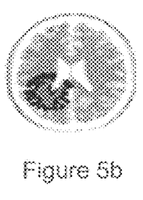
Figure 5C:
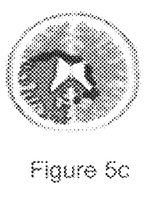
Figure 5D:
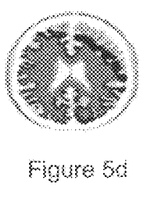
Figure 5E:
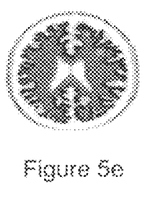
Figure 6A:
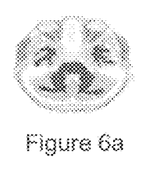
Figure 6B:
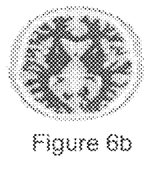
Figure 6C:
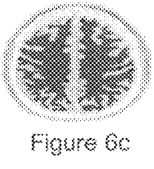
Figure 6D:
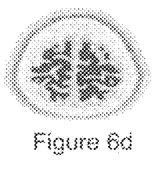
Figure 6E:
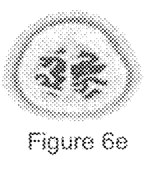

FIG. 3 illustrates a GPU implementation of the method for segmenting a volume dataset according to an embodiment of the invention using CUDA. As is evident to those skilled in the art, various other GPUs and programming languages are also employable for the implementation. At I, the level set field $\phi$ is initialized as disclosed above with respect to step 10 in FIG. 1. At II, active voxels in the level set field are determined as disclosed above with respect to step 12 in FIG. 1. If a voxel is identified as being active according to equation (4), its coordinates are written to memory—for example, to an auxiliary buffer—using the coordinates themselves as array indices—III. The content of the auxiliary buffer is then compacted to produce a dense list of active voxel coordinates—IV. The compacting has been implemented using a CUDA library process as disclosed in Sengupta S, Harris M, Zhang Y, Owens J D "*Scan primitives for GPU computing*", in GH'07: Proceedings of the 22$^{nd}$ ACM SIGGRAPH/EUROGRAPHICS Symposium on Graphics Hardware (2007), pp. 97-106. Alternatively, other compacting processes are employed such as, for example, disclosed in Billeter M, Olsson O, Assarson U "Efficient Stream Compaction on Wide SIMD Many-Core Architectures", in HPG'09: Proceedings of the ACM SIGGRAPH/EUROGRAPHICS Conference on High Performance Graphics (2009), pp. 159-166. At this point the GPU process has been initialized. During each time step, the process iterates over the dense list of active voxel coordinates and the level set field is updated at those coordinates according to equation (1)—V, which corresponds to step 14 in FIG. 1. The process then iterates over the dense list of active voxels a second time to update the set of active voxels by writing the coordinates of new active voxels to the auxiliary buffer and removing the coordinates of inactive voxels from the auxiliary buffer—VI, which corresponds to step 16 in FIG. 1. The content of the auxiliary buffer is then compacted into a dense list of active voxel coordinates—IV—for use in the following time step.

The GPU implementation of the method for segmenting a volume dataset according to an embodiment of the invention performs the segmentation process entirely on the GPU absent GPU-to-CPU message passing and GPU virtual memory paging, thus computation time of the segmentation process is substantially reduced compared to the state of the art. Furthermore, the method for segmenting a volume dataset according to an embodiment of the invention tracks active voxels at the resolution of one voxel instead of large tiles without reduction in performance. One additional active voxel adds one set of extra calculations to the GPU workload, while in tile-based state of the art GPU implementations one additional active voxel adds up to n sets of calculations to the GPU workload where n is the tile size.

In tests the accuracy, variability, and speed of the method for segmenting a volume dataset according to an embodiment of the invention has been evaluated by performing various segmentation tasks on volume datasets generated from the BrainWeb phantom dataset as disclosed, for example, in: Cocosco C A, Kollokian V, Kwan R K-S, Evans A C "Brain-Web: Online Interface to a 3D MRI Simulated Brain Database", NeuroImage 5(4), p. 425, 1997. The BrainWeb phantom dataset is used to generate simulated MRIs with a variety of noise levels in a controlled setting where the ground truth classification of each voxel is known.

To compare the method for segmenting a volume dataset according to an embodiment of the invention to the GPU narrow band process disclosed, for example, in:

Lefohn A E, Cates J E, Whitaker R E "*Interactive, GPU-Based Level Sets for 3D Segmentation*", MICCAI, pp. 564-572, 2003; and, Lefohn A E, Kniss J A, Hansen, Whitaker R E "*Interactive Deformation and Visualization of Level Set Surfaces Using Graphics Hardware*", IEEE Visualization 2003, pp. 75-82, 2003, repeated segmentations of the same dataset were performed and the method used to segment the dataset was controlled. In the control segmentation, the GPU narrow band process implemented according to Lefohn A E, Kniss J A, Whitaker R E "*A Streaming Narrow-Band Algorithm: Interactive Computation and Visualization of Level Sets*", IEEE Transactions on Visualization and Computer Graphics 10(4), pp. 422-433, 2004, was used. In the experimental segmentations, the embodiment of the invention described herein was used. Identical computer hardware configurations were used in the control and experimental segmentations.

To evaluate the accuracy and variability of the method for segmenting a volume dataset according to an embodiment of the invention, a series of repeated (N=10) white matter segmentations has been performed on $256^3$ T1w MRIs with varying amounts of noise and intensity non-uniformity. The images have been segmented using a randomized seed location. The accuracy of each segmentation was determined by calculating the Jaccard Score, the Dice Coefficient, and the Total Correct Fraction. To evaluate the speed, both the white and grey matter has been segmented in a noisy $256^3$ T1w MRI. Both, the number of active voxels per iteration and the computation time per iteration, as well as the total segmentation time has been measured.

FIGS. 4a to 4e show the progression—0 seconds, 2 seconds, 4 seconds, 8 seconds, and 11 seconds, respectively-of the segmentation process in 3D—using the method for segmenting a volume dataset according to an embodiment of the invention—while segmenting the white and grey matter in a noisy $256^3$ T1w MRI with 9% noise and 40% intensity non-uniformity.

FIGS. 5a to 5e show the progression—0 seconds, 4 seconds, 9 seconds, 11 seconds, and 12 seconds, respectively-of active voxels for a single 2D slice while segmenting the white matter in the $256^3$ T1w MRI above using the method for segmenting a volume dataset according to an embodiment of the invention. The segmented region is shown in gray. Active voxels are shown in black. Less than 3% of voxels are active at any time during the segmentation.

FIGS. 6a to 6e show various slices of the final white matter segmentation shown above. The final segmented region is shown in gray. Active voxels are shown in black. The segmentation is deemed to have converged since there are very few active voxels.

Best and worst case accuracies of the white matter segmentations are shown in Table 1 for measurements of Jaccard Score (J), Dice Coefficient (D), and Total Correct Fraction (TCF). The best case dataset has 0% noise and 0% intensity non-uniformity. The worst case dataset has 9% noise and 40% intensity non-uniformity. N=10 and ± is the standard error of the mean.

TABLE 1

| Dataset | GPU Algorithm | J | D | TCF |
| --- | --- | --- | --- | --- |
| best case | narrow band | 81.3% ± 0.0% | 89.7% ± 0.0% | 99.1% ± 0.0% |
|  | TC sparse field | 81.4% ± 0.0% | 89.7% ± 0.0% | 99.1% ± 0.0% |
| worst case | narrow band | 67.0% ± 0.0% | 80.2% ± 0.0% | 98.2% ± 0.0% |
|  | TC sparse field | 67.1% ± 0.0% | 80.3% ± 0.0% | 98.3% ± 0.0% |

It has been observed that respective accuracies of the method for segmenting a volume dataset according to an embodiment of the invention and the GPU narrow band process were equal to within 0.1%.

Figure 7A:
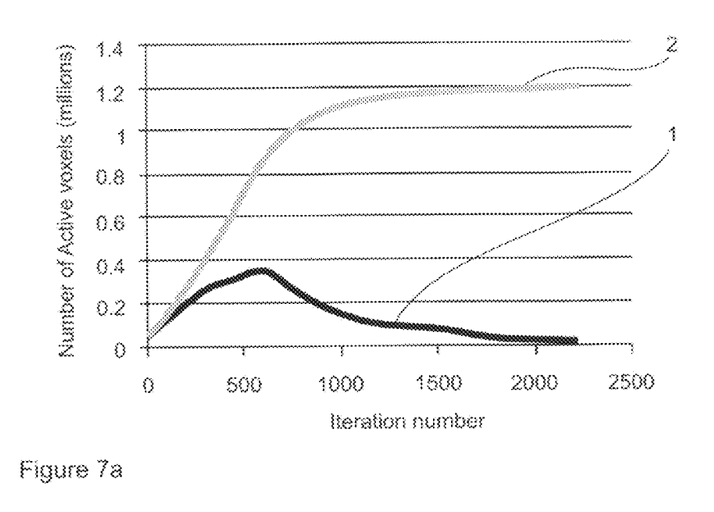
Figure 7B:
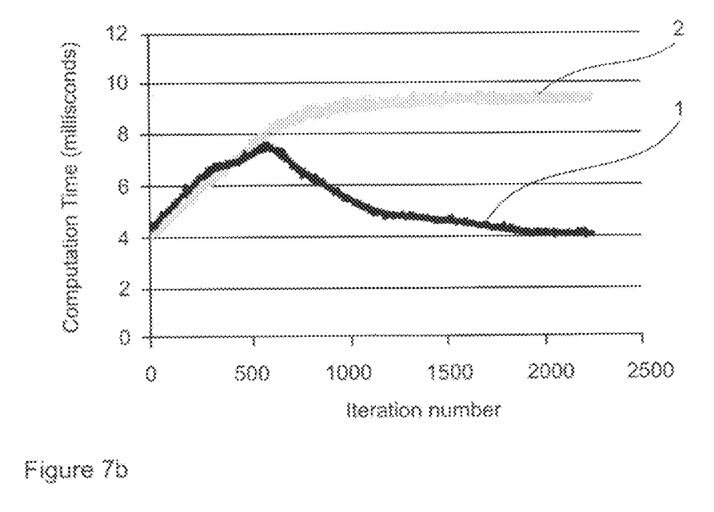

During iteration of the method for segmenting a volume dataset according to an embodiment of the invention the number of active voxels quickly peaked and decreased over time. This is in contrast to the GPU narrow band process, which monotonically increased the number of active voxels over time, as shown in FIGS. 7a and 7b. FIG. 7a shows the number of active voxels per iteration and FIG. 7b shows the computation time per iteration during segmentation of the white and grey matter in a noisy $256^3$ T1w MRI using the method for segmenting a volume dataset according to an embodiment of the invention 1 and the GPU narrow band process 2.

Moreover the method for segmenting a volume dataset according to an embodiment of the invention limited the computational domain to less than 3% of the volume dataset at all time steps-reducing the size of the computational domain by 16 times and the total computation time by 9 times compared to state of the art GPU implementations for an identical segmentation task on identical hardware.

A positive correlation between the number of active voxels per iteration and the computation time has been observed. After the number of active voxels has peaked, the speed of the segmentation process has increased over time which is in contrast to the GPU narrow band process, as shown in FIG. 7b.

The present invention has been described herein with regard to preferred embodiments. However, it will be obvious to persons skilled in the art that a number of variations and modifications can be made without departing from the scope of the invention as described herein.

What is claimed is:

1. A method comprising:
   a) using a processor, initializing a level set field within a multi-dimensional dataset comprising a plurality of voxels, the multi-dimensional dataset being indicative of an object;
   b) using the processor, determining an initial set of active voxels in dependence upon the initialized level set field;
   c) using the processor, iteratively repeating d) and e), below, until a quantitative stopping criterion is met, wherein each iteration of d) and e) is associated with a discrete time period;
   d) using the processor, updating the level set field for the set of active voxels;
   e) using the processor, updating the set of active voxels by:

selecting a voxel that comprises the level set field, wherein said selected voxel has a set of predetermined neighbor voxels;

determining whether the selected voxel is in temporal equilibrium by determining a state of equilibrium of the selected voxel and the set of predetermined neighbor voxels for the selected voxel at a first time and a second time, said second time associated with the discrete time period immediately after the discrete time period associated with said first time, wherein the selected voxel is in temporal equilibrium if the state of equilibrium for the selected voxel and each of the set of predetermined neighbor voxels of the selected voxel at the second time is unchanged from the state of equilibrium for the selected voxel and each of the predetermined neighbor voxels of the selected voxel, respectively, at the first time;

determining a spatial gradient of the level set field at a location of the selected voxel;

adding the selected voxel to the set of active voxels if the selected voxel is not in temporal equilibrium and the spatial gradient of the level set field at the location of the selected voxel is not equal to zero; and removing the selected voxel from the set of active voxels if the selected voxel is in temporal equilibrium or the spatial gradient of the of the level set field at the location of the selected voxel is equal to zero;

f) using the processor, determining level set segmentation data in dependence upon the updated level set field, the level set segmentation data being indicative of a feature of the object; and g) using the processor, providing the level set segmentation data.

2. A method as defined in claim 1, wherein the set of predetermined neighbors of the selected voxel consists of voxels bordering on the selected voxel.

3. A method as defined in claim 1 wherein the quantitative stopping criterion is dependent upon the number of active voxels in the set of active voxels.

4. A method as defined in claim 3 wherein the quantitative stopping criterion is met when the number of active voxels in the set of active voxels is less than a predetermined threshold.

5. A method as defined in claim 3, wherein the quantitative stopping criterion is met when the number of active voxels in the set of active voxels is zero.

6. A method as defined in claim 1 wherein coordinates of the active voxels are stored in a buffer and compacted into a dense list of active voxel coordinates, and wherein d) and e) are performed in dependence upon the dense list of active voxel coordinates.

7. A method as defined in claim 1 wherein a) to f) are performed using a graphics processing unit.

8. A method as defined in claim 1, wherein the initial and updated sets of active voxels are tracked at a resolution of one voxel.

9. A non-transitory storage medium having stored therein executable commands for execution on a processor, the processor when executing the commands performing:

a) using the processor, initializing a level set field within a multi-dimensional dataset comprising a plurality of voxels, the multi-dimensional dataset being indicative of an object;

b) using the processor, determining an initial set of active voxels in dependence upon the initialized level set field;

c) using the processor, iteratively repeating d) and e), below, until a quantitative stopping criterion is met, wherein each iteration of d) and e) is associated with a discrete time period;

d) using the processor, updating the level set field for the set of active voxels;

e) using the processor, updating the set of active voxels by:
selecting a voxel that comprises the level set field, wherein said selected voxel has a set of predetermined neighbor voxels;

determining whether the selected voxel is in temporal equilibrium by determining a state of equilibrium of the selected voxel and the set of predetermined neighbor voxels for the selected voxel at a first time and a second time, said second time associated with the discrete time period immediately after the discrete time period associated with said first time, wherein the selected voxel is in temporal equilibrium if the state of equilibrium for the selected voxel and each of the set of predetermined neighbor voxels of the selected voxel at the second time is unchanged from the state of equilibrium for the selected voxel and each of the predetermined neighbor voxels of the selected voxel, respectively, at the first time determining a spatial gradient of the level set field at a location of the selected voxel;

adding the selected voxel to the set of active voxels if the selected voxel is not in temporal equilibrium and the spatial gradient of the level set field at the location of the selected voxel is not equal to zero; and removing the selected voxel from the set of active voxels if the selected voxel is in temporal equilibrium or the spatial gradient of the of the level set field at the location of the selected voxel is equal to zero;

f) using the processor, determining level set segmentation data in dependence upon the updated level set field, the level set segmentation data being indicative of a feature of the object; and, g) using the processor, providing the level set segmentation data.

10. A non-transitory storage medium as defined in claim 9, wherein the initial and updated sets of active voxels are tracked at a resolution of one voxel.

11. A non-transitory storage medium as defined in claim 9, wherein the quantitative stopping criterion is dependent upon the number of active voxels in the set of active voxels.

12. A non-transitory storage medium as defined in claim 11, wherein the quantitative stopping criterion is met when the number of active voxels in the set of active voxels is less than a predetermined threshold.

13. A non-transitory storage medium as defined in claim 11, wherein the quantitative stopping criterion is met when the number of active voxels in the set of active voxels is zero.

14. A method of using a processor to update a set of active voxels that comprise a level set field by:

selecting a voxel from among a plurality of voxels that comprise the level set field, wherein said selected voxel has a set of predetermined neighbor voxels;

determining whether the selected voxel is in temporal equilibrium by determining a state of equilibrium of the selected voxel and the set of predetermined neighbor voxels for the selected voxel at a first time and a second time, said second time associated with a discrete time period immediately after a discrete time period associated with said first time, wherein the selected voxel is in temporal equilibrium if the state of equilibrium for the selected voxel and each of the set of predetermined neighbor voxels of the selected voxel at the second time is unchanged from the state of equilibrium for the selected voxel and each of the predetermined neighbor voxels of the selected voxel, respectively, at the first time;

adding the selected voxel to the set of active voxels if the selected voxel is not in temporal equilibrium; and removing the selected voxel from the set of active voxels if the selected voxel is in temporal equilibrium.

15. The method of claim 14, further comprising determining a spatial gradient of the level set field at a location of the selected voxel, wherein the selected voxel is added to the set of active voxels if the selected voxel is not in temporal equilibrium and the spatial gradient of the level set field at the location of the selected voxel is not equal to zero.

16. The method of claim 15, wherein the selected voxel is removed from the set of active voxels if the selected voxel is in temporal equilibrium or the spatial gradient of the of the level set field at the location of the selected voxel is equal to zero.

\* \* \* \* \*